(12) United States Patent
Snyder

(10) Patent No.: US 6,499,285 B1
(45) Date of Patent: Dec. 31, 2002

(54) PARTICLE SEPARATOR FOR A GAS TURBINE ENGINE

(75) Inventor: Philip H. Snyder, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 09/920,409

(22) Filed: Aug. 1, 2001

(51) Int. Cl.⁷ .............................................. F02C 7/052
(52) U.S. Cl. ......................... 60/39.092; 55/306; 55/396; 244/53 B
(58) Field of Search ..................... 60/39.092; 244/53 B; 55/306, 394, 396

(56) References Cited

U.S. PATENT DOCUMENTS

| | | | |
|---|---|---|---|
| 3,444,672 A | * | 5/1969 | Alsobrooks ............... 60/39.092 |
| 3,465,950 A | * | 9/1969 | Freid et al. ............... 60/39.092 |
| 3,521,431 A | | 7/1970 | Connors et al. |
| 3,534,548 A | | 10/1970 | Connors |
| 3,616,616 A | | 11/1971 | Flatt |
| 3,673,771 A | | 7/1972 | Dickey |
| 3,778,983 A | | 12/1973 | Rygg |
| 3,832,086 A | | 8/1974 | Hull, Jr. et al. |
| 3,970,439 A | | 7/1976 | Murphy |
| 3,979,903 A | * | 9/1976 | Hull et al. ............... 60/39.092 |
| 3,998,048 A | | 12/1976 | Derue |
| 4,509,962 A | | 4/1985 | Breitman et al. |
| 4,592,765 A | | 6/1986 | Breitman et al. |
| 4,617,028 A | | 10/1986 | Ray et al. |
| 4,702,071 A | | 10/1987 | Jenkins et al. |
| 4,704,145 A | | 11/1987 | Norris et al. |
| 4,860,534 A | | 8/1989 | Easley et al. |
| 4,881,367 A | | 11/1989 | Flatman |
| 4,928,480 A | * | 5/1990 | Oliver et al. ............ 60/39.092 |
| 5,039,317 A | | 8/1991 | Thompson et al. |
| 5,139,545 A | | 8/1992 | Mann |
| 5,279,109 A | * | 1/1994 | Liu et al. ................. 60/39.092 |
| 6,134,874 A | | 10/2000 | Stoten |

OTHER PUBLICATIONS

"CFD–Analysis of Coverplate Receiver Flow," Oliver Popp, Horst Zimmermann, Dr. J. Kutz, American Society of Mechanical Engineers, 96–GT–357, Jun. 10, 1996.

"The Development of a Powered Centrifugal Separator to Provide Air Inlet Protection of a Gas Turbine Engine," William E. Dowdell, Ting C. Tao, Seventh Annual Conference on Environmental Effects, 67–ENV–3, 1967.

"Investigation of Feasibility of Integral Gas Turbine Engine Solid Particle Inlet Separators," William J. McAnally, III, 10–ENV–4, 1971.

* cited by examiner

*Primary Examiner*—Michael Koczo
(74) *Attorney, Agent, or Firm*—Barnes & Thornburg (57) ABSTRACT

A particle separator for a gas turbine engine includes a housing defining an annular first flow passage, an annular first opening, and an annular second flow passage positioned in fluid communication with the first flow passage through the first opening. The particle separator also includes a plurality of first vanes coupled to the housing in the first flow passage and a plurality of blades positioned in the first flow passage for rotation about an axis of the particle separator in response to a stream of air flowing past the blades downstream of the first vanes to allow the blades to deflect particles entrained in the stream of air from the first flow passage into the second flow passage through the first opening.

27 Claims, 7 Drawing Sheets

PARTICLE SEPARATOR FOR A GAS TURBINE ENGINE

BACKGROUND AND SUMMARY OF THE INVENTION

The present invention relates to a particle separator, and particularly to a particle separator for. a gas turbine engine. More particularly, the present invention relates to a particle separator configured to separate particles from a stream of air entering an air intake of the engine.

Particle separators are provided to separate undesirable particles from a stream of air entering or flowing through a gas turbine engine. Such particles can adversely affect the internal working components of the engine. Some engines are intended to operate in particulate-laden environments, such as in dusty and sandy locations. In these types of environments, a particle separator capable of separating fine particles (e.g., particles having a diameter of 2.5 microns) from the stream of air entering the engine could help protect the engine.

According to the present disclosure, a particle separator for the air intake of a gas turbine engine includes a housing that defines an axis and is adapted to be coupled to the engine. The housing further defines an annular first flow passage, an annular first opening, and an annular second flow passage positioned in fluid communication with the first flow passage through the first opening. The first and second flow passages and the first opening are positioned concentrically about the axis.

The particle separator further includes a plurality of nozzle vanes coupled to the housing and spaced circumferentially about the axis in the first flow passage. The nozzle vanes are configured and positioned to impart a velocity to a stream of air flowing through the first flow passage and a different velocity to particles entrained in the stream of air as the stream of air flows past the nozzle vanes. The particle separator also includes a rotor including a plurality of blades positioned in the first flow passage and a blade support. The blades are coupled to the blade support for rotation of the blades about the axis in response to the stream of air flowing past the blades downstream of the first vanes. This allows the blades to deflect particles entrained in the stream of air into the second flow passage through the first opening so that the stream of air can enter the engine from the first flow passage free of the particles removed therefrom.

In illustrative embodiments, the particle separator includes an inlet and an outlet positioned radially inwardly from the inlet. The nozzle vanes, the blades, and the first opening are positioned generally radially inwardly from the inlet and generally radially outwardly from the outlet. In addition, the nozzle vanes and at least a portion of the first opening are positioned generally radially outwardly from the blades. This is so that the stream of air flows radially inwardly while the particles migrate radially outwardly through the first opening into the second flow passage in response to the particles impacting the rotating blades to achieve particle separation.

In other illustrative embodiments, the particle separator includes a row of de-swirl vanes coupled to the housing and positioned downstream of the nozzle vanes and the blades. The de-swirl vanes are configured to remove the swirling motion of the airstream induced by the nozzle vanes to limit the pressure drop across the particle separator.

In yet other illustrative embodiments, the particle separator includes an inertial particle separator section positioned upstream of the row of nozzle vanes, the rotor, and the row of de-swirl vanes. The nozzle vanes, the rotor, and the row of deswirl vanes may be thought of as being components of a dynamic particle separator section of the particle separator. The inertial particle separator section is configured to separate coarse particles from the airstream while the dynamic particle separator section is configured to separate fine particles from the airstream. Removal of coarse particles upstream from the dynamic particle separator section can help lengthen the useful life of the blades by avoiding erosion of the blade tips, or leading edges, that could be caused by coarse particles impacting the blade tips.

BRIEF DESCRIPTION OF THE DRAWINGS

The detailed description particularly refers to the accompanying figures in which.

DETAILED DESCRIPTION OF THE DRAWINGS

Figure 1:
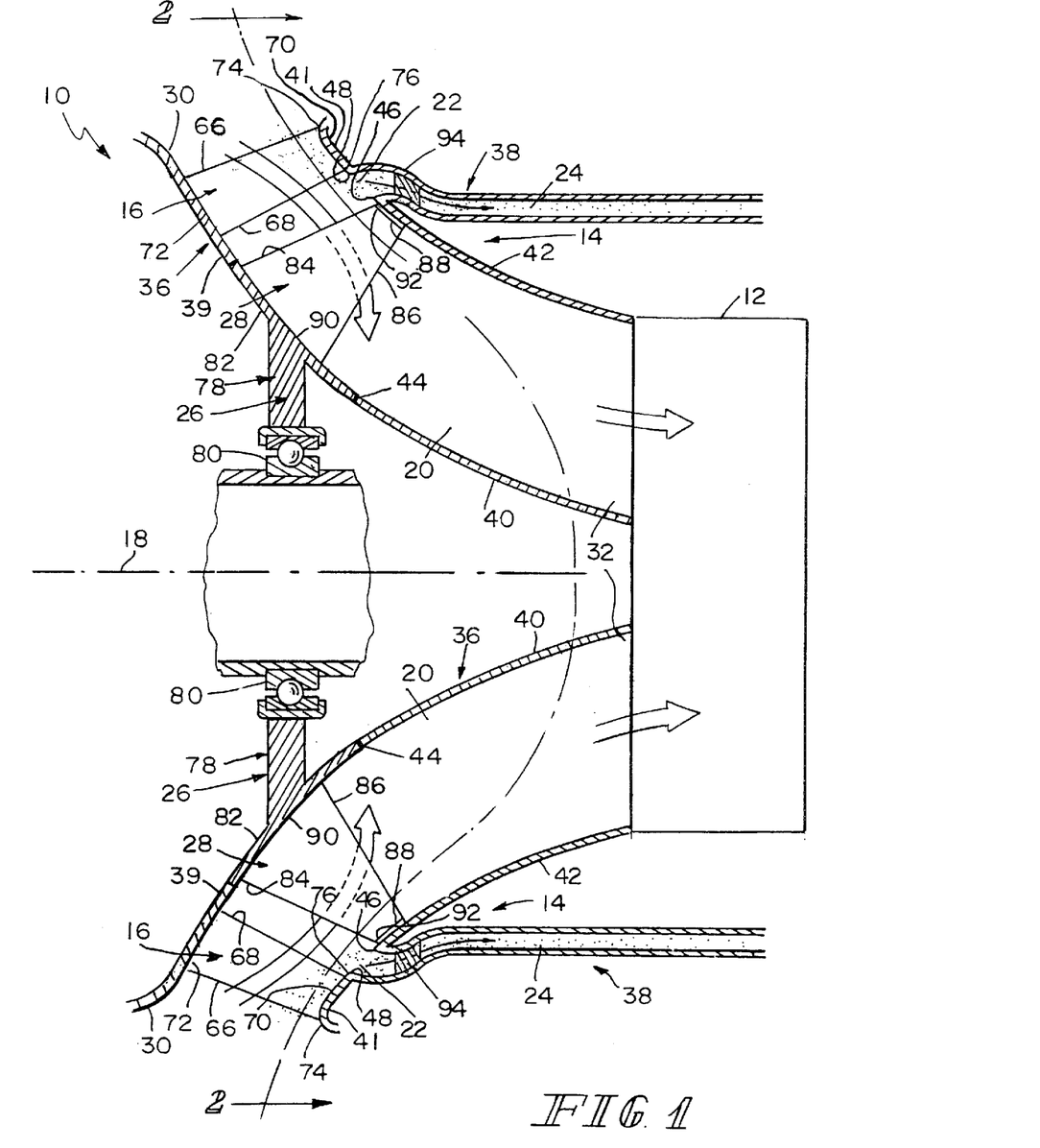
FIG. 1 is a sectional view of a dynamic particle separator having a row of nozzle vanes and a row of rotating deflector blades.
Figure 2:
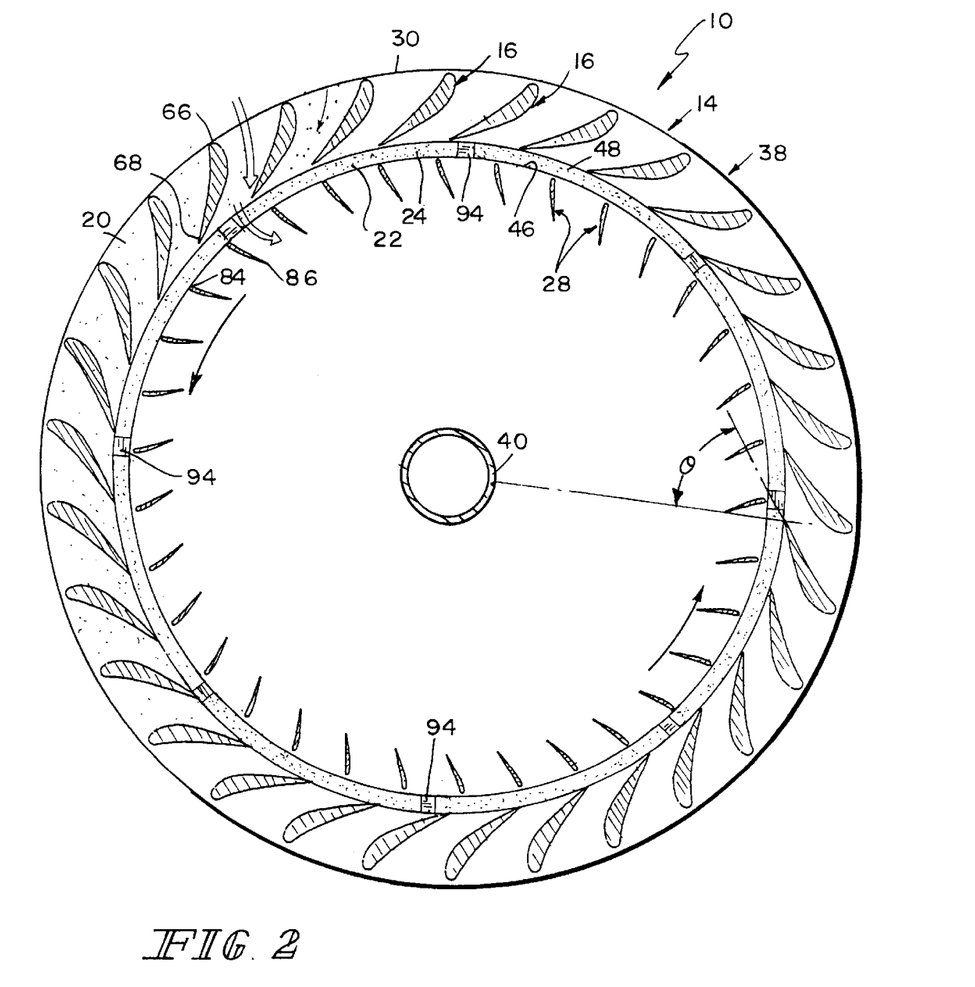
FIG. 2 is a sectional view taken along line 2—2 of FIG. 1.
Figure 7:
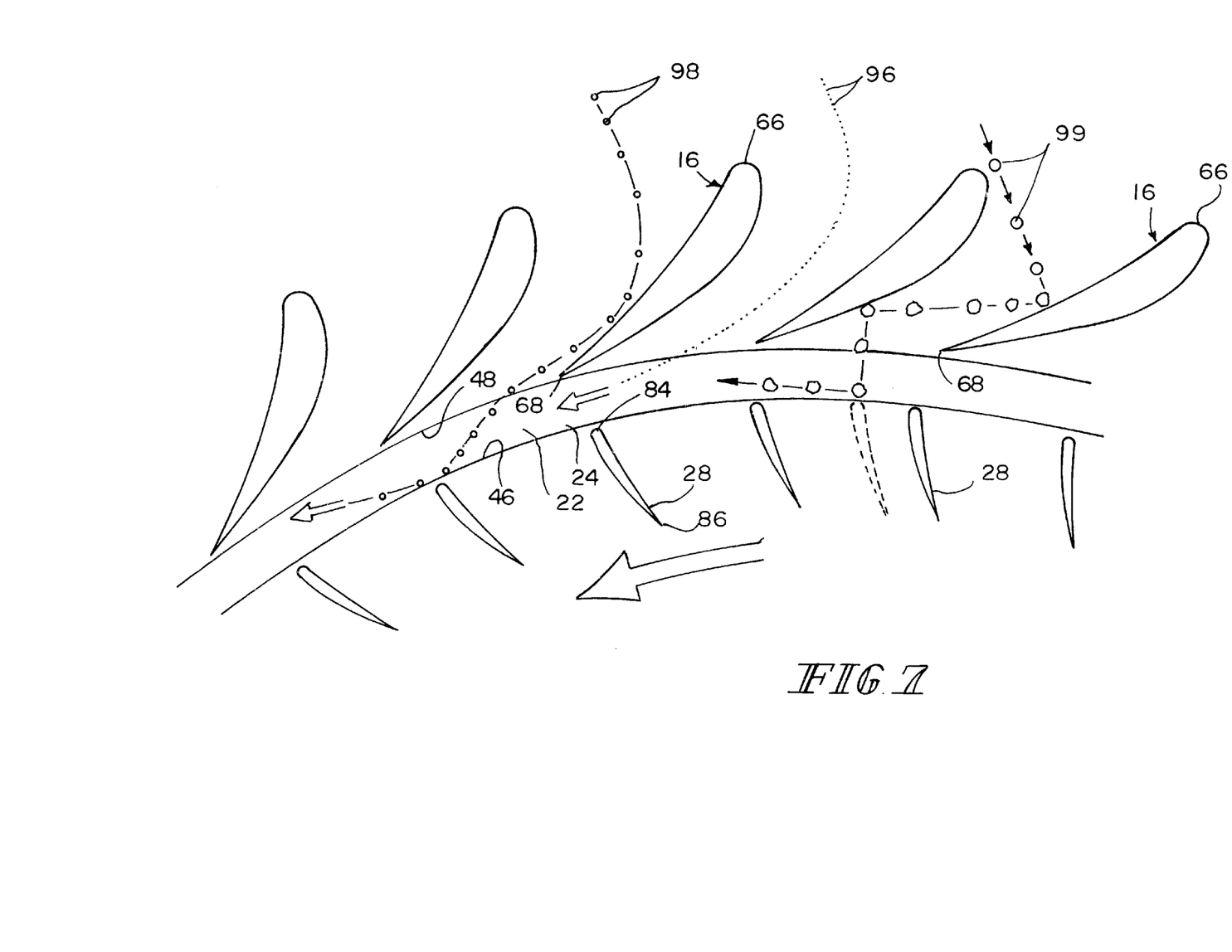
FIG. 7 is a diagrammatic view of how particles of different sizes may interface with the nozzle vanes and rotating deflector blades of the particle separators of FIGS. 1–6.

A dynamic particle separator 10 is configured to separate coarse and fine particles from a stream of air entering the air intake of a gas turbine engine 12, as illustrated, for example, in FIGS. 1, 2, and 7. Particle separator 10 includes a housing 14 adapted to be coupled to engine 12. Housing defines an axis 18, an annular first flow passage 20, an annular opening 22, and an annular second flow passage 24 positioned in fluid communication with first flow passage 20 through opening 22.

Particle separator 10 further includes a row of first, swirl or nozzle vanes 16 mounted to housing 14 and spaced about axis 18 in first flow passage 20 and a rotor 26 including a row of deflector blades 28 also spaced about axis 18 in first flow passage 20, as illustrated, for example, in FIGS. 1 and 2. Nozzle vanes 16 are configured to add swirling motion to the stream of air and the particles entrained therein, as discussed in more detail below. Rotor 26 is configured to rotate about axis 18 in response to the stream of air flowing past deflector blades 28 downstream of nozzle vanes 16 to deflect particles entrained in the stream of air into second flow passage 24 through opening 22. This is so that the stream of air can enter engine 12 from first flow passage 20 free of the particles removed therefrom.

Housing 14 further defines an annular inlet 30 and an annular outlet 32 in fluid communication with engine 12, as illustrated, for example, in FIG. 1. The stream of air, with particles possibly entrained therein, enters particle separator 10 through inlet 30 and a portion of the stream of air flows generally radially inwardly past nozzle vanes 16 and deflector blades 28 to exit particle separator 10 through outlet 32. Inlet 30, outlet 32, first and second flow passages 20, 24, and opening 22 are positioned concentrically about axis 18.

Housing 18 includes an inner wall 36 and an outer wall 38 spaced radially outwardly from inner wall 36, as illustrated, for example, in FIG. 1. Inner wall 36 includes a radially outer section 39 and a radially inner section 40. Outer wall 38 includes a radially outer section 41 and a radially inner section 42. Sections 39, 40, 41, 42 are positioned concentrically about axis 18 and cooperate to define first flow passage 20 which extends radially inwardly from inlet 30 to outlet 32. Radially outer section 39 of inner wall 36 and radially outer section 41 of outer wall 38 cooperate to define inlet 30. Radially inner section 40 of inner wall 36 and radially inner section 42 of outer wall 38 cooperate to define outlet 32. Radially outer and inner sections 41, 42 of outer wall 38 cooperate to define second flow passage 24. Radially outer and inner sections 39, 40 of inner wall 36 cooperate to define a rotor-receiving opening 44.

Radially outer and inner sections 41, 42 of outer wall 38 further cooperate to define opening 22, as illustrated, for example, in FIGS. 1 and 2. In particular, radially outer section 41 includes an annular first edge 46 and radially inner section 42 includes an annular second edge 48. First and second edges 46, 48 cooperate to define opening 22. First and second edges 46, 48 are concentric about axis 18.

Particle separator 10 further includes a plurality of supports 94 positioned downstream of opening 22 in second flow passage 24, as illustrated, for example, in FIGS. 1 and 2. Supports 94 are spaced circumferentially about axis 18 to position radially outer section 41 of outer wall 38 and radially inner section 42 of outer wall 38 relative to one another.

Inner and outer walls 36, 38 are configured so that a portion of first flow passage 20 is positioned at an angle to a plane positioned transversely to axis 18 so that first flow passage 20 has a radial component and an axial component, as illustrated, for example, in FIG. 1. Illustratively, the angle is between 5° and 30°.

Vanes 16 are similar to one another in structure and function. Thus, the description of one of vanes 16 applies to the other of vanes 16. Vane 16 is mounted to housing 14 against rotation about axis 18, as illustrated, for example, in FIG. 1. Illustratively, vane 16 can be mounted to housing 14 to swivel about an axis defined by vane 16 without rotating about axis 18 to accommodate a range of flow rates encountered between engine idle and engine full power.

Vane 16 is shaped like a cambered airfoil including a leading edge 66, a trailing edge 68, a radially outer end edge 70, and a radially inner end edge 72, as illustrated, for example, in FIGS. 1 and 2. Each end edge 70, 72 extends from leading edge 66 and trailing edge 68. Radially outer end edge 70 is positioned along radially outer section 41 of outer wall 38. Radially inner end edge 72 is positioned along radially outer section 39 of inner wall 36.

Vane 16 includes a radially outermost portion 74 and a juncture 76 where radially outer end edge 70 is coupled to trailing edge 68, as illustrated, for example, in FIG. 1. Juncture 76 is positioned a radial distance from axis 18 that is at least as great as a radial distance of second edge 48 from axis 18 to allow particles to flow through opening 22 into second flow passage 24 after passing vanes 16.

Rotor 26 further includes a hub or blade support 78 for deflector blades 28, as illustrated, for example, in FIG. 1. Blades 28 are mounted onto a portion 82 of blade support 78. Portion 82 is positioned in rotor-receiving opening 44. Blade support 78 is mounted onto a bearing 80 so that blade support 78, and thus blades 28, can rotate about axis 18. Rotor 26 is freewheeling in that rotor 26 is not driven, or caused to rotate, by any shaft, such as the drive shaft of engine 12. Rather, rotor 26 is driven by the stream of air as it passes blades 28.

Blades 28 are similar to one another in structure and function. Thus, the description of one of blades 28 applies to the other of blades 28. Blade 28 is shaped like a cambered airfoil including a leading edge 84, a trailing edge 86, a radially outer end edge 88, and a radially inner end edge 90, as illustrated, for example, in FIGS. 1 and 2. Each end edge 88, 90 extends from leading edge 84 and trailing edge 86. Radially outer end edge 88 is positioned along radially inner section 42 of outer wall 38. Radially inner end edge 90 is mounted onto portion 82 of blade support 78. Illustratively, leading edge 84 may be curved as it extends from radially outer end edge 88 to radially inner end edge 90. Illustratively, blade 28 may have no camber.

Blade 28 includes a radially outermost portion 92 that defines a juncture between leading edge 84 and radially outer end edge 88, as illustrated, for example, in FIG. 1. Portion 92 is positioned radially inwardly of juncture 76 of vane 16. Portion 92 is also positioned radially inwardly and axially rearwardly from second edge 48. Portion 92 may be positioned radially inwardly or radially outwardly of first edge 46.

Upon entering first flow passage 20 through inlet 30, the stream of air and particles entrained therein encounter the row of nozzle vanes 16, as illustrated, for example, in FIGS. 1 and 2. Vanes 16 turn the stream of air rapidly causing the stream of air to accelerate. This turning imparts a tangential velocity component to the stream of air (for purposes of this disclosure and the attached claims, the term "velocity" represents a vector having a speed and a direction). The tangential velocity component of the stream of air imparts a tangential velocity component to the particles due to aerodynamic drag. However, the particles, which are more dense than air, cannot follow the curved path of the stream of air due to their centrifugal forces. In particular, the particle velocity lags behind the air velocity in speed and direction upon passing vanes 16. Thus, vanes 16 are designed to induce a mismatch between the air velocity and the particle velocity.

After passing the row of nozzle vanes 16, the stream of air and the particles encounter rotor 26, and, more particularly, deflector blades 28. The stream of air passes deflector blades 28 at a low angle of incidence thereto. Rotor 26, and thus deflector blades 28, rotate about axis 18 in response to the stream of air passing deflector blades 28.

The particles arrive at deflector blades 28 with only a fraction of the speed of the stream of air so that the particles impact deflector blades 28 at a high angle of incidence to deflector blades 28. The impact of the particles on the rotating deflector blades 28 causes the particles to bounce off the deflector blades 28 with a high tangential velocity component along with a radially outward velocity component. The particles may then bounce back and forth between nozzle vanes 16 and deflector blades 28 until the particles flow generally radially outwardly, due to the tangential velocity component imparted by deflector blades 28, through opening 22 into second flow passage 24 to achieve particle separation from the stream of air flowing generally radially inwardly to outlet 32.

Particles of different size may follow different flow paths as they pass by nozzles vanes 16 and deflector blades, as shown, for example, in FIG. 7. For example, a relatively small particle 96 may curve past nozzle vanes 16 directly through opening 22 into second flow passage 24 without ever impacting either nozzle vanes 16 or deflector blades. In addition, a particle 98 of relatively intermediate size may follow a somewhat curved path wherein particle 98 impacts one of nozzle vanes 16 and collides with one of rotating deflector blades 28, thereby causing particle 98 to flow tangentially and radially outwardly through opening 22 into second flow passage 24. A relatively larger particle 99 may follow a path that is more straight than particles 96, 98. In particular, particle 99 may impact one of nozzle vanes 16 and rebound therefrom to collide with an adjacent nozzle vane 16. After doing so, particle 99 may strike one of rotating deflector blades 28, thereby causing particle 99 to flow tangentially and radially outwardly through opening 22 into second flow passage 24.

Figure 3:
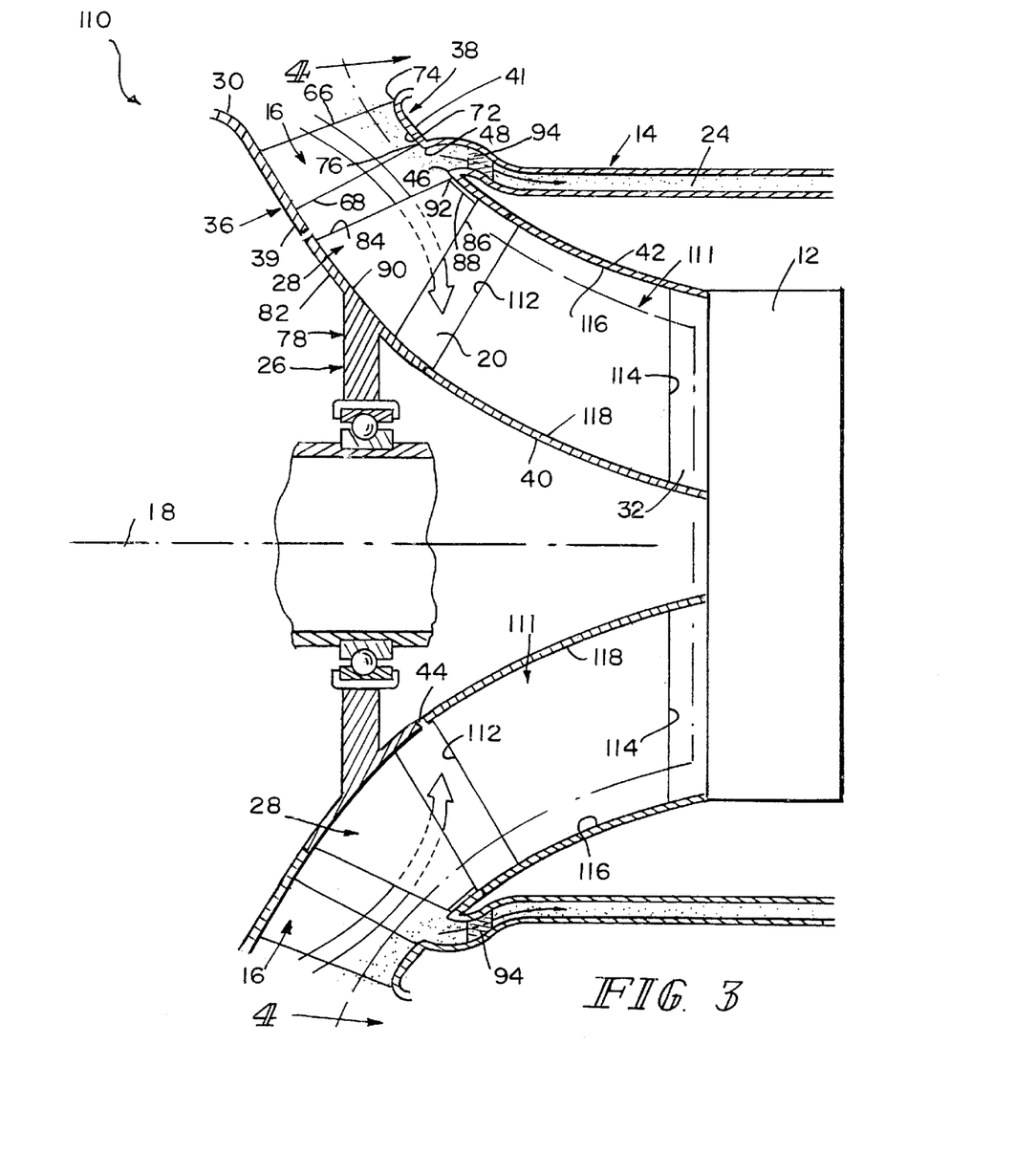
FIG. 3 is a sectional view of another dynamic particle separator having a row of nozzle vanes, a row of rotating deflector blades, and a row of de-swirl vanes.
Figure 4:
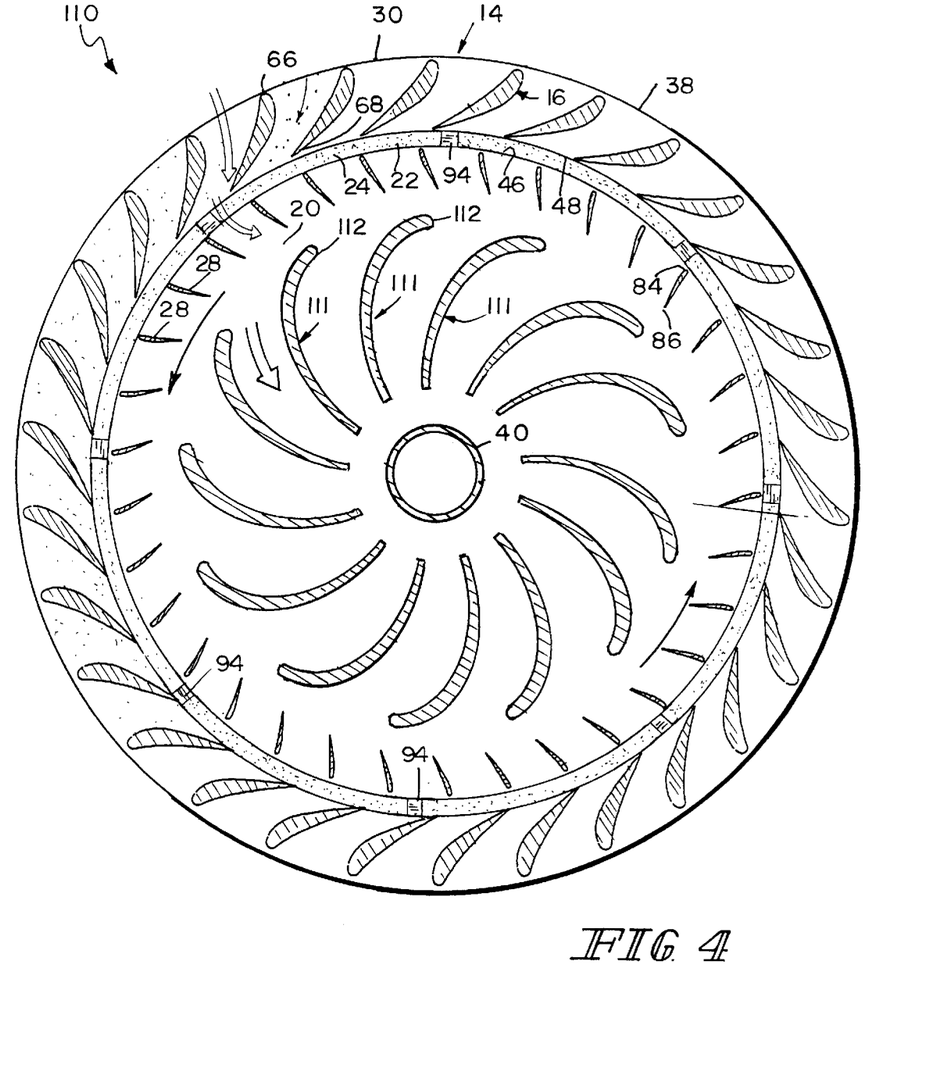
FIG. 4 is a sectional view taken along line 4–4 of FIG. 2.

In another embodiment, a dynamic particle separator 110 is similar in structure and operation to particle separator 10, except as otherwise noted, so that the same reference numerals. are used to refer to similar components, as illustrated, for example, in FIGS. 3 and 4.

Particle separator 110 is different from particle separator 10 in that particle separator 10 includes a row of de-swirl vanes 111, as illustrated, for example, in FIGS. 3 and 4. De-swirl vanes 111 are configured to remove any swirl in the stream of air downstream of nozzle vanes 16 and rotor 26. This is so that the stream of air can enter engine 12 without any swirling motion. In particular, de-swirl vanes 111 remove any tangential velocity component from the stream of air before the stream of air exits particle separator 111 through outlet 32. In addition, de-swirl vanes are configured to diffuse the stream of air to reduce the air velocity. Moreover, de-swirl vanes 111 cooperate to limit the pressure drop across particle separator 110.

De-swirl vanes 111 are similar to one another in structure and function. Thus, the description of one of de-swirl vanes 111 applies to the other of de-swirl vanes 111. Vane 111 is mounted to housing 14 against rotation about axis 18, as illustrated, for example, in FIGS. 3 and 4.

Vane 111 includes a leading edge 112, a trailing edge 114, a radially outer end edge 116, and a radially inner end edge 118, as illustrated, for example, in FIGS. 3 and 4. Each end edge 116, 118 extends from leading edge 112 and trailing edge 114. Radially outer end edge 116 is positioned along radially inner section 42 of outer wall 38. Radially inner end edge 118 is positioned along radially inner section 40 of inner wall 36.

Figure 5:
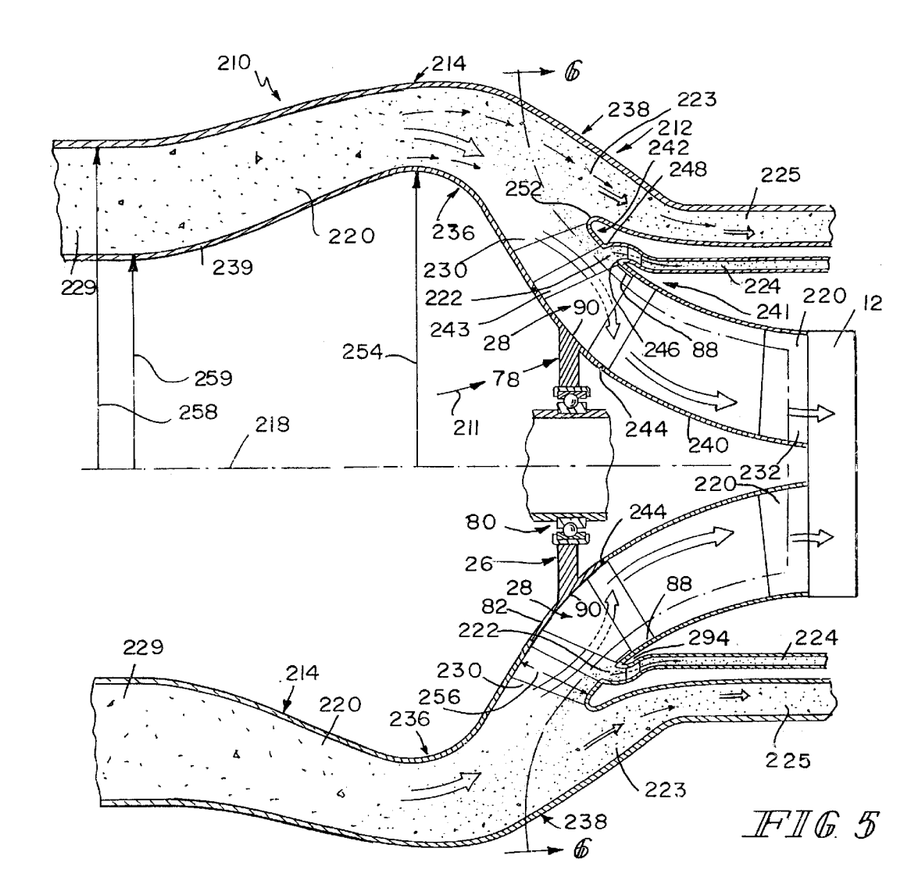
FIG. 5 is a sectional view of particle separator including an inertial particle separator section and a dynamic particle separator section having a row of nozzle vanes, a row of rotating deflector blades, and a row of de-swirl vanes.
Figure 6:
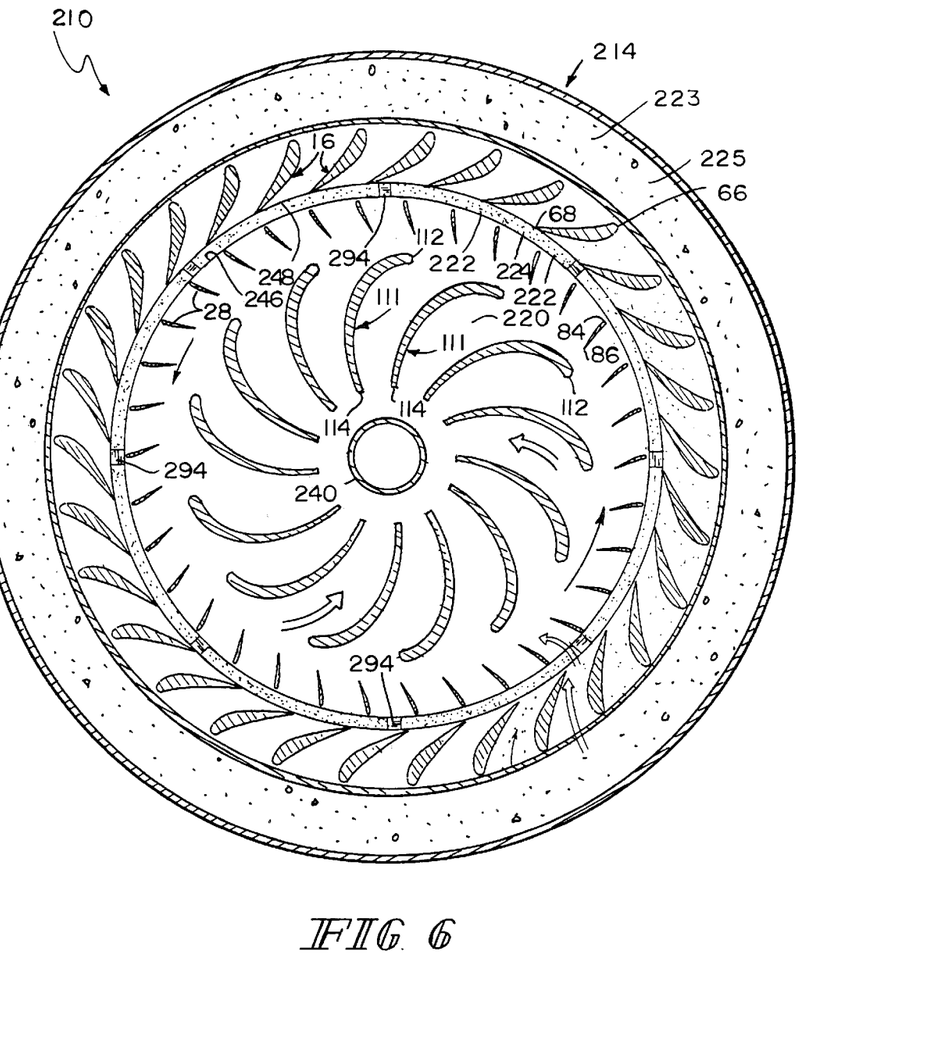
FIG. 6 is a sectional view taken along line 6—6 of FIG. 5.

In yet another embodiment, a dynamic-inertial particle separator 210 is also configured to separate particles from a stream of air entering the air intake of engine 12, as illustrated, for example, in FIGS. 5 and 6. Dynamic-inertial particle separator 210 combines components of dynamic particle separators 10 and 110 with components of an inertial particle separator to form a dynamic particle separator section 211 and an inertial particle separator section 212.

Inertial section 212 is positioned upstream of dynamic section 211 so that the stream of air enters inertial section 212 before dynamic section 211, as illustrated, for example, in FIGS. 5 and 6. Inertial section 212 is configured to separate relatively coarse particles from the stream of air before the stream of air enters dynamic section 211. Dynamic section 211 then separates relatively fine particles from the stream of air to allow the stream of air to enter engine 12 free of the particles removed therefrom. Dynamic section 211 operates like particle separators 10 and 110 so that the functional description of those particle separators also applies to dynamic section 211 and is not repeated with respect to dynamic-inertial particle separator 210.

Particle separator 210 includes a housing 214 adapted to be coupled to engine 12, as illustrated, for example, in FIGS. 5 and 6. Housing 214 defines an axis 218, an annular inlet 229, and an annular outlet 232. Inlet 229 and outlet 232 are positioned concentrically about axis 218. The stream of air enters particle separator 210 and inertial section 212 through inlet 229 and exits particle separator 10 and dynamic section 211 through outlet 232. The stream of air enters dynamic section 211 through an annular dynamic section inlet 230 defined by housing 214 concentrically about axis 218.

Housing 214 further defines an annular first flow passage 220 extending from inlet 229 to outlet 232, annular first opening 222, an annular second flow passage 224 in fluid communication with first flow passage 220 through first opening 222, an annular second opening 223,, and an annular third flow passage 225 in fluid communication with first flow passage 220 through second opening 223, as illustrated, for example, in FIGS. 5 and 6. Each of first, second, and third flow passages 220, 224, 225 and first and second openings 222, 223 are positioned concentrically about axis 218.

Housing 214 includes an inner wall 236 and an outer wall 238 spaced radially outwardly from inner wall 236, as illustrated, for example, in FIGS. 5 and 6. Inner and outer walls 236, 238 cooperate to define inlet 229 and are positioned concentrically about axis 218. Illustratively, a radius 259 of inner wall 236 at inlet 229 is about 10 inches and a radius 258 of outer wall 238 at inlet 229 is about 15 inches.

Inner wall 236 includes an axially forward section 239 and an axially rearward section 240 that cooperate to define a rotor-receiving opening 244, as illustrated, for example, in FIG. 5. Axially forward section 239 includes a peak 250 positioned upstream of dynamic section inlet 230 and second opening 223. Illustratively, a radius 254 of peak is about 14 inches.

Particle separator 210 further includes a plurality of supports 294 positioned downstream of first opening 222 in second flow passage 224, as illustrated, for example, in FIGS. 5 and 6. Supports 294 are spaced circumferentially about axis 218 to position first partition 241 and second partition 242 relative to one another.

Housing further includes a first partition 241 and a second partition 242, as illustrated, for example, in FIG. 5. Both partitions 241, 242 are positioned between inner and outer walls 236, 238 and concentrically about axis 218. First partition 241 is positioned between second partition 242 and inner wall 236 and cooperates with second partition 242 to define second flow passage 224 and first opening 222. Second partition 242 is positioned between first partition 241 and outer wall 238 and separates second flow passage 224 from third flow passage 225. Second partition 242 cooperates with outer wall 238 to define third flow passage 225 and second opening 223.

Inner wall, first partition 241, and second partition 242 cooperate so that a portion 243 of first flow passage 220 is positioned at an angle to a plane positioned transversely to axis 218. Thus, portion 243 of first flow passage 220 has a radial component and an axial component, as illustrated, for example, in FIGS. 5 and 6. Illustratively, the angle is between 5° and 30°.

Second partition 242 includes an annular splitter 252, as illustrated, for example, in FIG. 5. Splitter 252 is positioned concentrically about axis 218 and is shaped to separate relatively coarse particles from the stream of air before the stream of air passes through dynamic section inlet 230 into dynamic section 211. Splitter 252 cooperates with axially forward section 239 of inner wall 236 to define dynamic section inlet 230. Illustratively, a distance 256 measured across dynamic section inlet 230 is about four inches.

First partition includes an annular first edge 246 corresponding to first edge 46 of the embodiments described above, as illustrated, for example, in FIGS. 5 and 6. Splitter 252 includes an annular second edge 248 corresponding to second edge 48 of the previous embodiments. Edges 246, 248 are positioned concentrically about axis 218 and cooperate to define first opening 222. First edge 246 is positioned radially inwardly of second edge 248.

Like dynamic particle separator 110, dynamic section 211 includes the row of nozzle vanes 16, a rotor 26 including the row of deflector blades 28 downstream of nozzle vanes 16, and a row of de-swirl vanes 111, as illustrated, for example, in FIGS. 5 and 6. Nozzle vanes 16, deflector blades 28, and de-swirl vanes 111 are positioned in the dynamic particle separator section of first flow passage 220 between dynamic inlet 230 and outlet 232.

Nozzle vanes 16 are mounted to axially forward section 239 of inner wall 236 against rotation about axis 218, as illustrated, for example, in FIG. 5. De-swirl vanes 111 are mounted to axially rearward section 240 of inner wall 236 also against rotation about axis. 218. Portion 82 of blade support 78 of rotor 26 is positioned in rotor-receiving opening 244. Illustratively, each nozzle vane 16 can be mounted to housing 214 to swivel about an axis defined by respective vane 16 without rotating about axis 218.

Any of particle separators 10, 110, and 210 may be aligned with a centerline of engine 12 so that the engine centerline coincides with respective axis 18, 218. In addition, a drive shaft (not shown) of engine 12 may extend through particle separator 10, 110, 210 along respective axis 18, 218.

It is believed that each of particle separators 10, 110, and 210 can separate crushed quartz particles having a diameter of 2.5 microns or more from a stream of air while experiencing no more than a 1.5% pressure drop across the respective particle separator 10, 110, 210. The mass flow rate for achieving this fine particle separation is 12.5 lbm/sec. Rotor 26 is turned at 9000 rpm and has a diameter of about 16.5 inches (the rotor diameter is measured from blade tip to blade tip, that is, from radially outermost portion 92 of one deflector blade 28 to radially outermost portion 92 of a diametrically opposite deflector blade 28). There are 18 to 40 nozzle vanes 16 and 5 to 45 deflector blades 28. Illustratively, the distance, or width, from radially inner end edge 90 of deflector blade 28 to radially outer end edge 88 thereof is about four inches.

Nozzle vanes 16 turn the air flow at a turn angle θ of 45° to 80°, as illustrated, for example, in FIG. 2. Illustratively, turn angle θ is between 70° and 75°.

Blade 28 can be arranged so that radially outer end edge 88 and radially inner end edge 90 are circumferentially offset from one another, that is, they are positioned on different planes extending radially from and parallel to respective axis 18, 218. In other words, blade 28 can be positioned to lean, or tilt, at a tilt angle so that radially inner end edge 90 is positioned circumferentially ahead of radially outer end edge 88 relative to the direction of rotation of rotor 26. Such a tilt angle can be used to influence the trajectory of particles bouncing off of blade 28 to promote passage of particles from respective first flow passage 20, 220 through respective opening 22, 222 into respective second flow passage 24, 224. Illustratively, the tilt angle can be between 0° and 30°.

Blade 28 may be generally straight or may be contoured as it extends from radially inner end edge 90 to radially outer end edge 88. For example, with respect to the contouring, blade 28 may be curved somewhat as it extends from radially inner end edge 90 to radially outer end edge 88. This contouring may be in addition to providing blade 28 with or without a tilt angle. It is believed that particle separators 10, 110, and 210 can separate other particles besides crushed quartz, although the size of those particles may differ from 2.5 microns.

It will be appreciated that the actual dimensions of each particle separator will be dictated by a wide variety of parameters. Typically, a design engineer will use computer-aided design techniques to run computer simulations and vary the dimensions to tailor the particle separator to the specific application. While FIGS. 1–7 show generally representative proportioning of three particle separators 10, 110, and 210 for a single application, it will be appreciated that the dimensions will change with varying applications.

Although the invention has been disclosed in detail with reference to certain illustrative embodiments, variations and modifications exist within the scope and spirit of the invention as described and defined in the following claims.

What is claimed is:

1. A particle separator for a gas turbine engine, the particle separator comprising:

a housing that defines an axis and is adapted to be coupled to the engine, the housing defining an annular first flow passage positioned concentrically about the axis, an annular first opening positioned concentrically about the axis, and an annular second flow passage positioned concentrically about the axis in fluid communication with the first flow passage through the first opening, a plurality of first vanes coupled to the housing and spaced circumferentially about the axis in the first flow passage, the first vanes being configured and positioned to impart a velocity to a stream of air flowing through the first flow passage and a different velocity to particles entrained in the stream of air as the stream of air flows past the first vanes, and a rotor including a plurality of blades, positioned in the first flow passage downstream of the first vanes and adjacent the first opening and a blade support, the blades being coupled to the blade support for rotation of the blades about the axis in response to the stream of air flowing past the blades downstream of the first vanes to allow the blades to deflect particles entrained in the stream of air from the first flow passage through the first opening into the second flow passage.

2. The particle separator of claim 1, wherein the first vanes are mounted to the housing against rotation about the axis.

3. The particle separator of claim 2, wherein the first vanes are positioned on a plane transverse to the axis and the blades are positioned on a second plane transverse to the axis.

4. The particle separator of claim 1, wherein the housing further defines an annular inlet and an annular outlet, the first flow passage extends from the inlet to the outlet, and the inlet and the outlet are concentric about the axis.

5. The particle separator of claim 4, wherein the portion of the housing defining the first opening includes a first edge and a second edge positioned radially inwardly of the first edge and the portion of the housing defining the portion of the first flow passage extending from the second edge to the outlet is positioned radially inwardly of the portion of the housing defining the second flow passage.

6. The particle separator of claim 1, wherein each first vane includes a radially outermost portion, each blade includes a radially outermost portion, and the radially outermost portions of the first vanes are positioned radially outwardly of the radially outermost portions of the blades.

7. The particle separator of claim 6, wherein the portion of the housing defining the first opening includes a first edge and a second edge positioned radially inwardly of the first edge and the radially outermost portions of the blades are positioned radially inwardly of the first edge.

8. The particle separator of claim 1, wherein the portion of the housing defining the first opening includes a first edge and a second edge positioned radially inwardly of the first edge, each first vane includes a leading edge, a trailing edge, a radially inner end edge, and a radially outer end edge, each of the radially inner and outer end edges extends from the leading edge to the trailing edge, and the radially outer end edge is positioned at a radial distance from the axis that is at least as great as a radial distance of the first edge from the axis.

9. The particle separator of claim 8, wherein each of the blades includes a leading edge, a trailing edge, a radially inner end edge, and a radially outer end edge, each of the radially inner and outer end edges of the blade extends from the leading edge of the blade to the trailing edge of the blade, and the radially outer end edges of the blades are positioned radially inwardly of the radially outer end edges of the first vanes.

10. The particle separator of claim 1, further comprising a plurality of second vanes mounted to the housing in the first flow passage against rotation about the axis and the second vanes are spaced circumferentially about the axis on a plane transverse to the axis to direct the stream of air after the stream of air has flowed past the blades.

11. The particle separator of claim 1, wherein the housing further defines an annular second opening and an annular third flow passage positioned in fluid communication with the first flow passage through the second opening and the second opening and the third flow passage are positioned concentrically about the axis.

12. The particle separator of claim 11, wherein the second opening is positioned radially outwardly of the first opening.

13. The particle separator of claim 11, wherein the housing includes a peak positioned axially upstream of the second opening to induce particles entrained in the stream of air to flow under the influence of their inertia from the first flow passage through the second opening into the third flow passage.

14. The particle separator of claim 13, wherein the peak is positioned radially outwardly of the first vanes and the blades.

15. The particle separator of claim 11, wherein the third flow passage is positioned radially outwardly of the second flow passage.

16. The particle separator of claim 1, wherein each first vane is configured and positioned to deflect particles entrained in the stream of air off the first vane at an angle different from another angle at which the first vane deflects a portion of the stream of air.

17. A particle separator for a gas turbine engine, the particle separator comprising:

a housing that defines an axis and is adapted to be coupled to the engine, the housing defining an annular inlet, an annular outlet, an annular first flow passage extending from the inlet to the outlet and having at least a portion extending radially inwardly, an annular first opening, and an annular second flow passage in fluid communication with the first flow passage through the first opening, the inlet, the outlet, the first flow passage, the first opening, and the second flow passage being positioned concentrically about the axis, the portion of the housing defining the first opening including a first edge and a second edge radially inwardly of the first edge, a plurality of first vanes coupled to the housing against rotation about the axis and positioned in the portion of the first flow passage extending radially inwardly, the first vanes being spaced circumferentially about the axis, a radially outermost portion of each first vane being positioned radially outwardly of the first edge, the first vanes being configured and positioned to impart a tangential velocity component to a stream of air flowing from the inlet through the first flow passage to the outlet and a different tangential velocity component to particles entrained in the stream of air as the stream of air flows radially inwardly past the first vanes, and a rotor including a plurality of blades positioned in the first flow passage, downstream of the first vanes and adjacent the first opening, and a blade support, the blades being spaced circumferentially about the axis, a radially outermost portion of each blade being positioned radially inwardly of the radially outermost portion of each first vane and radially inwardly of the first edge, the blades being coupled to the blade support for rotation about the axis in response to the stream of air flowing radially inwardly past the blades downstream of the first vanes to allow the blades to deflect particles entrained in the stream of air from the first flow passage through the first opening into the second flow passage.

18. The particle separator of claim 17, wherein the first vanes are positioned on a first plane transverse to the axis and the blades are positioned on a second plane transverse to the axis and are spaced apart from the first vanes.

19. The particle separator of claim 17, wherein the portion of the first flow passage extending from the second edge to the outlet is positioned radially inwardly of the second flow passage.

20. The particle separator of claim 17, wherein each first vane includes a leading edge, a trailing edge, a radially inner end edge, and a radially outer end edge, each of the radially inner and outer end edges extends from the leading edge to the trailing edge, and the radially outer end edge is positioned at a radial distance from the axis that is at least as great as a radial distance of the first edge from the axis.

21. The particle separator of claim 17, the housing further defines an annular second opening and an annular third flow passage positioned in fluid communication with the first flow passage through the second opening and the second opening and the third flow passage are positioned concentrically about the axis.

22. The particle separator of claim 21, wherein the housing includes a peak positioned axially rearwardly of the inlet and axially forwardly of the second opening to induce particles entrained in the stream of air to flow under the influence of their inertia from the first flow passage through the second opening into the third flow passage.

23. The particle separator of claim 22, wherein the peak is positioned radially outwardly of the radially outermost portion of each first vane.

24. The particle separator of claim 22, wherein the peak is positioned radially outwardly of the radially outermost portion of each blade.

25. The particle separator of claim 21, wherein the third flow passage is positioned radially outwardly of the second flow passage.

26. The particle separator of claim 21, wherein the portion of the housing defining the second opening is positioned radially outwardly of the portion of the housing defining the first opening.

27. The particle separator of claim 17, further comprising a plurality of second vanes positioned in the first flow passage and spaced circumferentially about the axis on a plane transverse to the axis to direct the stream of air after the stream of air has flowed past the blades.

* * * * *